United States Patent

Forst et al.

[15] 3,638,674
[45] Feb. 1, 1972

[54] GASTIGHT DAMPER HAVING AN INFLATABLE SEAL

[72] Inventors: Donald L. Forst, Barberton; Edwin B. Schrengauer, Wadsworth, both of Ohio

[73] Assignee: The Babcock & Wilcox Company, New York, N.Y.

[22] Filed: Mar. 12, 1970

[21] Appl. No.: 18,987

[52] U.S. Cl. .......................... 137/375, 251/173, 251/306
[51] Int. Cl. ................................................ F16k 3/02
[58] Field of Search ........................... 251/173; 137/375

[56] References Cited

UNITED STATES PATENTS

| 2,945,667 | 7/1960 | Bibbo | 251/173 |
| 1,990,309 | 2/1935 | Phillips | 251/173 X |
| 2,939,674 | 6/1960 | Anderson | 251/173 |

*Primary Examiner*—Harold W. Weakley
*Attorney*—J. Maguire

[57] ABSTRACT

A structural member defining an opening. Pivotally mounted within the opening is a damper blade, the blade being movable between open and closed; means for so moving are also provided. An inflatable sealing member having a sealing surface for contact with the edge of the damper blade and responsive to changes in pressure within the sealing member is attached in sealing relationship to an internal surface of the structural member and is positioned in a plane transverse to gas flow through the opening. There is further provided a means for inflating and deflating the sealing member.

4 Claims, 3 Drawing Figures

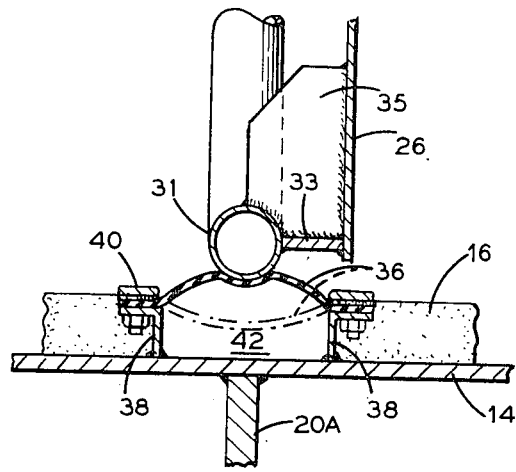
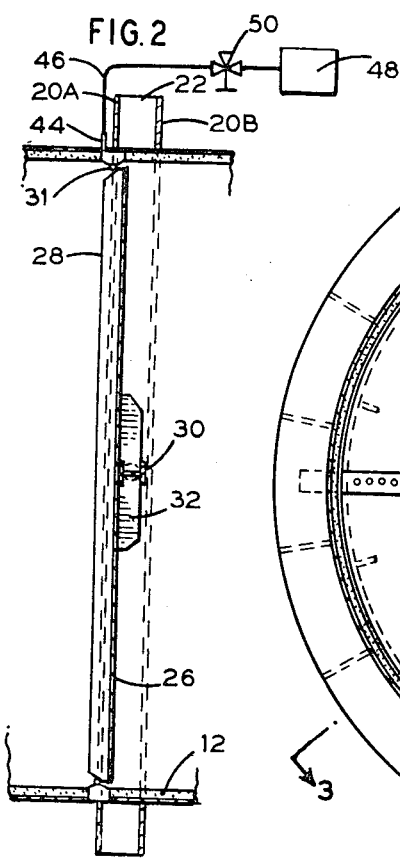
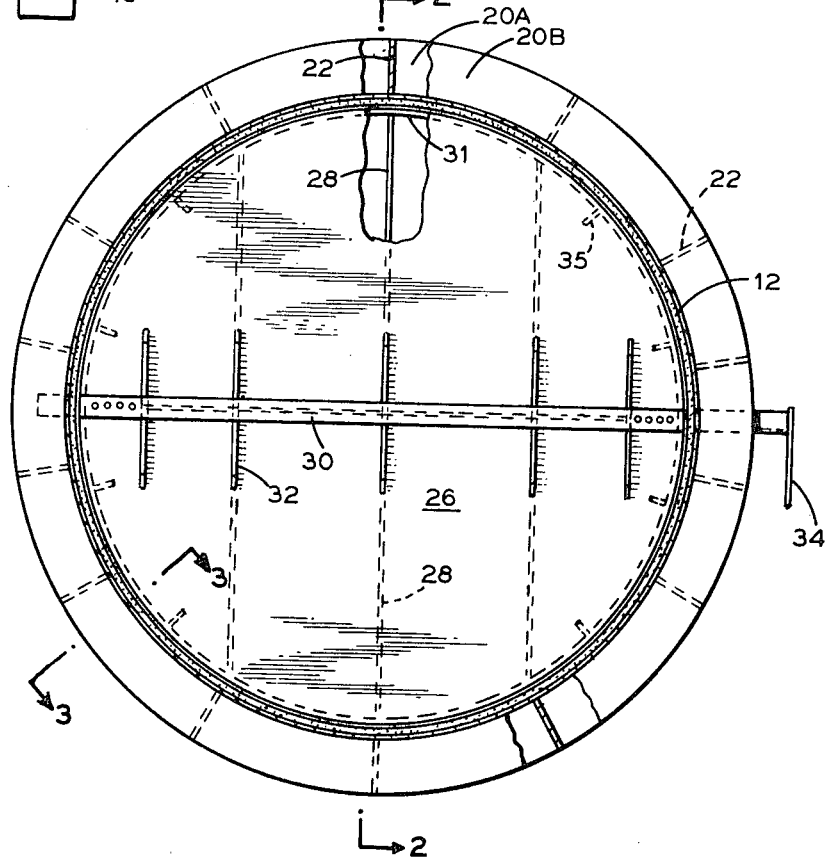
FIG. 3
FIG. 2
FIG. 1
INVENTORS
Donald L. Forst
Edwin B. Schrengauer
BY
ATTORNEY

GASTIGHT DAMPER HAVING AN INFLATABLE SEAL

The invention relates generally to dampers and the like for regulating the flow in a duct and especially to a gastight damper assembly installed therein and having an inflatable seal for improving the operational effectiveness thereof.

Industrial plants often employ ducts for conducting various gaseous fluids containing particulate matter, with a damper assembly being used to control flow through the ducts. It is frequently desirable to close the duct for such purposes as to isolate equipment during repair. In operation, however, the damper may not make a gastight seal against the frame because particulate matter often builds up on the seating surface of the frame or because the gases have eroded the seating surfaces with the result that the damper is of limited effectiveness. One approach to remedying this problem is disclosed in U.S. Pat. No. 3,084,715. It is therein taught to use a resilient sealing member between the frame and the blade member.

According to this invention, an inflatable member, as distinguished from a resilient member, is used as the sealing means between the interior of the duct and the blade. The gastight damper assembly of this invention comprises a structural member, e.g., a duct, defining an opening; a blade member pivotally mounted within the opening; means for rotating the blade member between open and closed positions; an inflatable sealing member having a sealing surface for contact with the blade member and responsive to changes in pressure within the sealing member, the sealing member being attached in sealing relationship to an internal surface of the structural member and positioned in a plane transverse the gas flow; means for inflating the sealing member into sealing relationship with the blade member when the blade member is in the closed position; and means for deflating the sealing member.

For purposes of this disclosure "inflating the sealing member" shall mean increasing the fluid pressure within the sealing member to a pressure substantially greater than the gas pressure within the duct; "deflating the sealing member" shall mean decreasing the fluid pressure within the sealing member to a pressure substantially less than the gas pressure within the duct.

This invention solves the problem of ineffective sealing, while at the same time provides an assembly in which there is only minimal wear on the seating surfaces. The quality of the sealing may be determined by the degree of inflation, which of course is dependent on the pressure differential between the fluid pressure within the seal and the gas pressure within the duct. Wear is minimized by the fact that the seal may be deflated during the opening and the closing of the blade, and inflated into sealing relationship with the blade when the blade is in the closed position.

FIG. 1 is an end view of a duct including a damper assembly constructed in accordance with this invention.

FIG. 2 is a sectional view of the assembly taken along line 2—2 of FIG. 1.

FIG. 3 is an enlarged, detailed sectional view taken along line 3—3 of FIG. 2.

The invention is here shown as being directed to a damper assembly adapted for use in a cylindrical duct 12 carrying hot gases containing particulate matter. It is the purpose of the damper assembly to control the flow of gas through duct 12.

The duct 12 is shown as comprising an outer metallic skin 14 and an inner layer of refractory material 16 to protect the outer skin 14 from excessive heat and erosion.

A support assembly encircles the duct 12 to lend structural stability to the duct 12 and to provide a means for mounting the damper assembly within the duct 12. The support assembly includes circular shaped structural members 20A and 20B, and radial webs 22 periodically spaced around the duct 12 between the members 20A and 20B, the webs 22 being welded to the duct 12 and to the structural members 20A and 20B.

Positioned within the duct 12 is a damper blade assembly pivotally connected to the support assembly so that the blade assembly is movable between open and closed positions relative to the opening defined by the duct. The blade assembly, including a blade 26 and stiffeners 28, is rigidly mounted on a shaft 30 by means of mounting brackets 32. The shaft 30 extends through the wall of the duct 12 and is pivotally connected to the support assembly. Mounted on the periphery of the blade 26 is a seating surface. The seating surface, as best seen in FIG. 3, is shown as a tubular member 31. The tubular member 31 is mounted on the blade 26 by means of a mounting ring 33 and braces 35.

Flow through the duct 12 is controlled by the extend to which the damper blade 26 is open. In the closed position there will be no flow through the duct 12. For purposes of this disclosure, the force for positioning the damper may be applied manually to shaft 30 through a positioning lever 34, but the concept is not so limited as it is well known that various hydraulic, electrical and pneumatic powered devices can be employed for this purpose.

According to the invention an inflatable sealing member is provided to form a gastight seal between the duct 12 and the damper blade 26 when the damper blade 26 is in the closed position. As best illustrated in FIG. 3, the sealing member includes a flexible sealing surface 36 and seal mounting rings 38. The seal-mounting rings 38 are welded to the interior surface of the duct 12. The sealing surface 36 is attached in sealing relationship with the mounting rings 38 by means of seal attachment rings 40 bolted to the mounting rings 38. It will be apparent from the drawings and the foregoing description that this type of construction results in the forming of a gastight chamber 42 defined by a portion of the wall of duct 12, the seal-mounting rings 38 and the flexible sealing surface 36.

It is important that the sealing surface 36 be sufficiently pliable to be responsive to changes of pressure within the chamber 42, so that the sealing edge 36 may be moved into and out of sealing relationship with the seating surface 31 of the blade 26 when the blade 26 is in the closed position. Furthermore the sealing edge 36 should be of a durable, heat resistant material. Teflon has been found acceptable.

A connector 44 is provided through which the sealing member may be inflated or deflated. A fluid, e.g., pressurized air, is supplied to the connector 44 during inflation of the member through line 46 from a source 48. The pressure within the chamber 42 is regulated by a 3-way control valve 50. The seal may be deflated by venting the fluid to the atmosphere through valve 50, or alternatively by applying a vacuum to the chamber 42.

The preferred mode of operation is that the sealing member be maintained in the deflated position (as shown by the dotted lines in FIG. 3) when the damper blade 26 is open. This minimizes surface exposure to the gas stream and minimizes pressure drop. It should also be maintained in the deflated position during closing. Since, if operated in this manner, there is no contact between the sealing surface 36 and the seating surface 31 during closing, there is no frictional wear between them. When the blade 26 is fully closed the sealing member may be inflated so that the sealing surface 36 is moved into sealing relationship with the seating surface 31 of the blade 26. The degree of inflation should be such that the fluid pressure within the chamber 42 is substantially greater than the gas pressure within the duct 12.

When it is desirable to move the blade 26 to the open position and resume gas flow through the duct 12, the sealing member should first be deflated, i.e., the fluid pressure within the chamber 42 should be reduced until the pressure is substantially less than the gas pressure within the duct 12. The blade 26 may then be moved without any frictional wear.

A damper assembly constructed in accordance with this invention has recently been installed in a 14-foot diameter duct, carrying gas from a basic oxygen furnace. These gases carried a high content of iron-oxide particles and it was of course important that a gastight seal be obtained. Such a seal was obtained, furthermore only minimal maintenance has been required because there is essentially no frictional wear on the seating surfaces. It was found that when the invention of this disclosure was employed in this service, in addition to the heretofore mentioned advantages, it permitted greater tolerances in the spacing between the duct and the blade member than most prior art devices. Also, it was found that it was sometimes desirable to inflate and then deflate the sealing member immediately before closing, in order to break loose the particulate matter which had settled on the sealing surface of the sealing member.

What is claimed is:

1. The combination of a refractory lined metal duct defining a passage of circular cross section, means for conveying a hot gas through the passage and a gastight damper assembly cooperating with the duct to regulate the flow of hot gases therethrough, said damper assembly comprising a shaft extending diametrically across the passage and through the duct to be rotatably supported therefrom, a blade member offset radially from said shaft and rigidly connected thereto, the blade member including a ring portion defining a first circumferential seating surface, means for rotating the blade member between open and closed positions, a pair of spaced annular flanges abutting the metallic inner surface of the duct and rigidly connected thereto, a heat-resistant flexible member extending across and rigidly connected to the inner periphery of said pair of flanges and cooperating therewith to form a fluidtight chamber, said flexible member defining a second circumferential seating surface, said first and second seating surfaces having a common circular plane and being concentric and contiguous with one another when the damper is in closed position, means for pressurizing the chamber thereby inflating the flexible member to achieve a substantially fluidtight seal between said first and second seating surfaces, and means for depressurizing the chamber thereby deflating said flexible member.

2. The combination according to claim 1 wherein the means for pressurizing the chamber includes a source of superatmospheric air located outside of the duct passage and flow-connected to said chamber.

3. The combination according to claim 1 wherein the means for depressurizing the chamber includes a valve located outside of the duct passage, the valve having selective means for flow-connecting said chamber to the atmosphere.

4. The combination according to claim 3 wherein said valve selective means flow-connects said chamber to means for lowering the chamber pressure below atmospheric pressure.

* * * * *